S. McNABB.
COMBINED AUTOMOBILE JACK AND TIRE PUMP.
APPLICATION FILED JULY 30, 1914.
1,147,110.
Patented July 20, 1915.
2 SHEETS—SHEET 1.
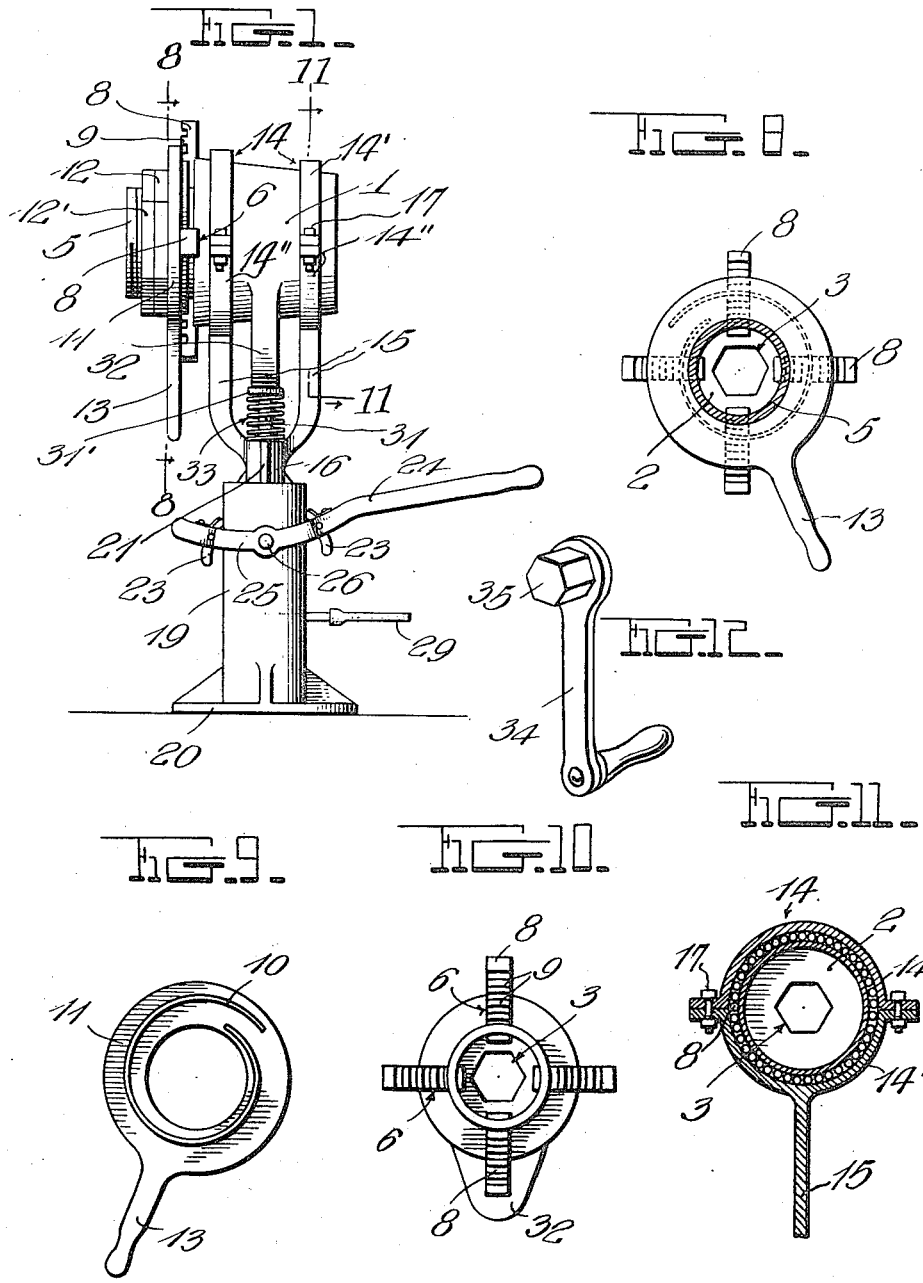
Witnesses
H. Woodard
Inventor
Sherman McNabb
By H. B. Willson & Co.
Attorneys

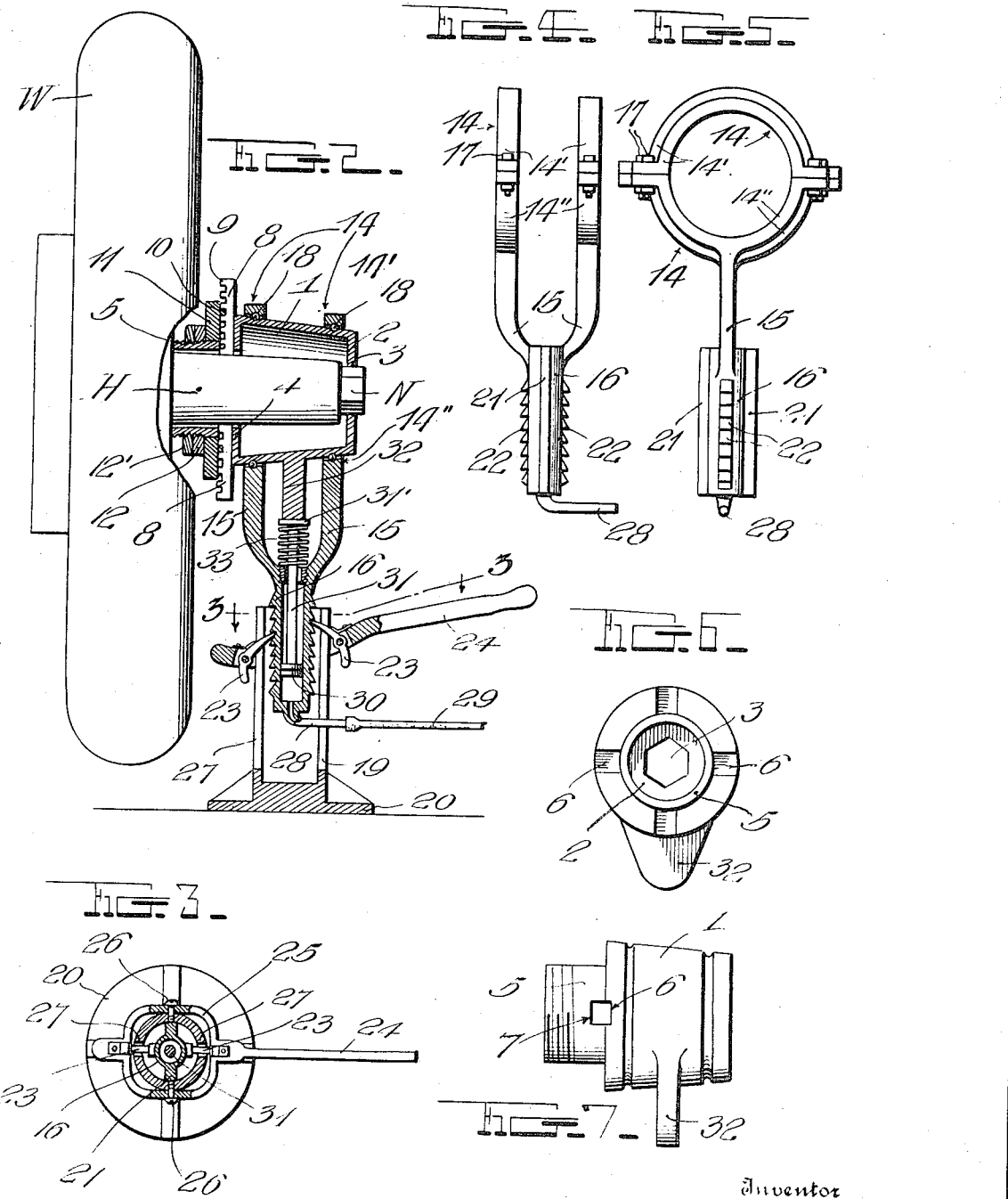

UNITED STATES PATENT OFFICE.

SHERMAN McNABB, OF PRAGUE, OKLAHOMA.

COMBINED AUTOMOBILE-JACK AND TIRE-PUMP.

1,147,110.    Specification of Letters Patent.    Patented July 20, 1915.

Application filed July 30, 1914. Serial No. 854,099.

*To all whom it may concern:*

Be it known that I, SHERMAN MCNABB, a citizen of the United States, residing at Prague, in the county of Lincoln and State of Oklahoma, have invented certain new and useful Improvements in Combined Automobile-Jacks and Tire-Pumps; and I do declare the following to be a full, clear, and exact description of the invention, such as will enable others skilled in the art to which it appertains to make and use the same.

My invention is a combined automobile jack and tire pump, and has for its object to provide an extremely simple device which may be used either as an automobile jack or a tire pump or may be used for performing both duties at the same time.

Heretofore, it has been common practice to provide tire pumps having means for attachment to the drive wheels of an automobile and to provide an independent jack whereby the wheel, to which the device is to be attached, may be raised above the ground.

My invention aims to combine the jack and pump in a single article and, to the above end, the invention resides in certain novel features of construction and combination herein described and claimed and shown in the drawings wherein—

Figure 1 is a side elevation of a combined pump and jack constructed in accordance with my invention; Fig. 2 is a central vertical section through the device, showing its application to the hub of an automobile wheel; Fig. 3 is a horizontal section taken on the line 3—3 of Fig. 2; Figs. 4 and 5 are respectively side and edge views of the combined jack shank and pump cylinder and the parts carried thereby; Fig. 6 is an inner end view of the hub engaging member; Fig. 7 is a side view thereof; Fig. 8 is a vertical transverse section taken on the line 8—8 of Fig. 1; Fig. 9 is a face view of the jaw operating ring; Fig. 10 is a view similar to Fig. 6 but showing the clamping jaws in position; Fig. 11 is a vertical transverse section taken on the line 11—11 of Fig. 1; and Fig. 12 is a perspective view of a crank which may be employed for manually operating the device.

In the accompanying drawings, I have shown an automobile wheel W having the usual hub H which is provided with a nut or dust cap N on its outer end as is common to devices of this character.

The construction so far described is of common formation and forms no part of the present invention.

Adapted to be positioned on the hub H, as clearly seen in Fig. 2, is a substantially cylindrical member 1 whose outer end is closed by an upright wall 2 having a polygonal opening 3 at its center, said opening being adapted to receive the nut N. The opposite end of the member 1 is provided with an inwardly extending flange 4 to which an outwardly projecting sleeve 5 is integrally connected, said sleeve being adapted to loosely embrace the inner end of the hub H as clearly seen in the drawings. Formed at suitable intervals in the outer face of the flange 4, is a plurality of radially extending guideways 6 which register with rectangular openings 7 formed through the sleeve 5, said guideways 6 and openings 7 receiving a number of clamping jaws 8 whose inner ends may be serrated, if desired.

In the present embodiment of the invention, the jaws 8 are shown in the form of rectangular rack bars whose teeth 9 are formed adjacent the wheel W, a spiral thread 10 being engaged with said teeth whereby the jaws may be moved inwardly or outwardly when the thread is turned, said thread being here shown as formed integral with a jaw operating ring 11 which is revolubly mounted upon the sleeve 5 and held thereon by means of a nut 12 and a lock nut 12' which are threaded on the outer end of said sleeve. The ring 11 is provided with any suitable form of operating handle 13 by which it may be readily turned to move the jaws inwardly into contact with the hub H or outwardly to allow the device to be removed from the hub.

From the above description, it will be seen that I have provided means for clamping the member 1 to the hub H in such a manner as to cause said member to rotate therewith but that this clamping means need not be in the specific form illustrated in the drawings.

Embracing the cylindrical member 1 is a pair of bearing rings 14 which are here shown as formed in two sections 14' and 14", the latter being formed integral with a pair of arms 15 which rise rigidly from a combined jack shank and pump cylinder 16. As clearly shown in Figs. 5 and 11, both of the members 14' and 14" are of semicircular formation and are rigidly united by bolts or other suitable fastening means 17. As clearly seen in Figs. 2 and 11, a number of ball bearings 18 are preferably interposed between the inner surfaces of the rings 14, and the periphery of the member 1, said rings and member being provided with suitable ball races for the reception of said bearings.

The arms 15 are here shown as being formed integrally with the combined shank and pump cylinder 16, which latter is slidably mounted within an upright guide sleeve 19 which is provided with any suitable base 20, said combined shank and cylinder being preferably provided with upright ribs 21 which contact with the opposite sides of the sleeve 19, thereby retaining the parts in their respective positions at all times. The member 16 is further provided with ratchet teeth 22 which are formed on its opposite sides, said ratchet teeth being engaged by spring pressed pivoted pawls 23 which are mounted on a lever 24, the latter having a portion 25 which surrounds the sleeve 19 and is pivoted thereto as indicated at 26. As clearly shown in Figs. 2 and 3, the pawls 23 project through upright slots 27 which are formed in the opposite sides of the sleeves 19, one of said slots also receiving an outwardly projecting nipple 28 which is formed on the lower end of the member 16, this feature of construction effectively preventing said member from rotating within the sleeve as well as establishing communication between the interior of the cylinder and a flexible tube 29 which may be provided with any suitable means (not shown) for attachment to the valve stem of a tire.

Mounted for reciprocation in the member 16, is a piston 30, the stem 31 of which rises and is provided with a head 31' located between the arms 15, said head being adapted to be engaged by a suitable cam 32 which is here shown as formed integrally with the member 1, said cam acting to depress the piston 30 against the tension of a coil spring 33 which is interposed between said head and the upper end of the member 16, thus forcing air from the tube 29 on the descent of the piston, the spring 33 acting to return the latter to normal position.

With the parts as above described, the operation of the device is as follows: The member 1 is positioned upon the hub H as shown in Fig. 2 and the ring 11 is rotated by its handle 13 to force the jaws 8 into contact with said hub, thereby securely clamping the member 1 upon the latter. The lever 24 is now rocked around its pivots 26 to cause the pawls 23 to successively engage the ratchet teeth 22 thereby raising the member 16 and consequently the entire wheel W to such an extent as to allow the latter to be positioned out of contact with the ground. The wheel W may now be rotated by the motor of the vehicle, this movement rotating the member 1 and causing the cam 35 to depress the piston 30 at intervals, between which intervals said piston is returned to normal position by the spring 33.

From the above set forth construction, it will be seen that I have produced an extremely simple device which may be used for an automobile jack or for a combined automobile jack and tire pump. The device may further be used as a pump alone by employing a crank 34 which is provided with a polygonal head 35 adapted to be inserted into the opening 3. It will readily be seen that the member 1 may be rotated to reciprocate the piston by the use of this crank.

I may here explain that, by the positioning of the ears on the bearing sections 14' and 14", said ears may be positioned beneath the axle of a vehicle in which case the device may be used as a jack instead of as a combined pump and jack.

I have described my invention with considerable minuteness and have set forth certain specific embodiments for carrying out the objects of the invention but I wish it understood that I need not be limited to the features of construction herein disclosed otherwise than as amplified in the appended claims.

Having thus described my invention, what I claim as new and desire to secure by Letters Patent is:

1. A combined automobile jack and tire pump comprising a vertically adjustable hollow jack shank, a rotary member carried by said shank and adapted to be attached to and driven by an automobile wheel, and a piston in the hollow shank reciprocated by rotation of the aforesaid member.

2. A combined automobile jack and tire pump comprising a jack shank having a bore, a piston therein, a wheel engaging member revolubly supported by said shank, means for clamping said member to an automobile wheel, means for raising said shank and operating elements carried by said piston and said member for reciprocating the former upon rotation of the latter.

3. A combined automobile jack and tire pump comprising an upright guide, a jack shank slidable therein and having a bore, ratchet teeth formed on said shank, a lever having a pawl coacting with said teeth for raising the shank, a piston in said bore, a wheel engaging member revolubly supported by said shank, means for clamping said member to an automobile wheel and operating elements carried by said piston and said member for reciprocating the former upon rotation of the latter.

4. A combined automobile jack and tire pump comprising a jack shank having a bore, a piston in said bore, a bearing rising from said shank, a wheel engaging member revolubly supported in said bearing, means for clamping said member upon an automobile wheel, operating elements carried by said member and said piston for reciprocating the latter upon rotation of the former, and means for raising said shank.

5. A combined automobile jack and tire pump comprising an upright shank having a bore, a piston in said bore, a pair of arms rising in spaced relation from said shank, bearings carried by the upper ends of said arms, a wheel engaging member revolubly mounted in said bearings, means for clamping said member upon an automobile wheel, operating elements carried by said member and said piston for reciprocating the latter upon rotation of the former, and means whereby said shank may be raised.

6. A combined automobile jack and tire pump comprising an upright shank having a bore, a substantially cylindrical hub engaging member revolubly supported by said shank, means for clamping said member upon the hub of an automobile wheel, a cam formed on the periphery of said member, a piston in the bore of said shank, a piston rod rising from said piston and disposed in the path of said cam, and means whereby vertical adjustment of said shank may be effected.

7. A combined automobile jack and tire pump comprising an upright jack shank, a substantially cylindrical hub engaging member revolubly supported thereby, means for clamping said member upon the hub of an automobile wheel, means carried by said member for operating a pump, and means whereby vertical adjustment of said shank may be effected.

8. A combined automobile jack and tire pump comprising a jack shank, a substantially cylindrical hub engaging member revolubly supported thereby, said member having an opening in one end adapted to receive the outer end of the hub, means whereby the opposite end of said member may be centered and clamped upon the hub, means carried by said member for operating an air pump, and means whereby vertical adjustment of said shank may be effected.

9. A combined automobile jack and tire pump comprising a jack shank, a hollow substantially cylindrical hub engaging member revolubly supported thereby and having a central opening in one end adapted to receive the outer end of a hub, radial guides formed on the opposite end of said member, clamping jaws slidable in said guides, means whereby said jaws may be simultaneously actuated, means carried by said member for operating a pump, and means whereby vertical adjustment of said shank may be effected.

10. A combined automobile jack and tire pump comprising a jack shank, a hollow substantially cylindrical hub engaging member revolubly supported thereby, a number of radial guides formed on said member, a number of toothed jaws slidable in said guides, an operating ring revolubly mounted on said member and having a spiral thread engaged with the teeth on said jaws, means carried by said member for operating a pump, and means whereby vertical adjustment of said shank may be effected.

11. A combined automobile jack and tire pump comprising an upright jack shank, a hollow substantially cylindrical hub engaging member revolubly mounted thereon, radial guides formed on one end of said member, a tubular extension projecting outwardly from said end and having openings registering with said guides, toothed clamping jaws slidable in said guides and through said openings, an operating ring revolubly mounted upon said tubular extension and having a spiral thread engaged with the teeth of said jaws, means carried by said member for operating a pump, and means whereby vertical adjustment of said shank may be effected.

12. A combined automobile jack and tire pump comprising an upright jack shank, a substantially cylindrical hub engaging member revolubly mounted thereon, radial guides formed on one end of said member, a tubular extension formed on said end and having openings registering with said guides, toothed clamping jaws slidable in said guides and through said openings, an operating ring revolubly mounted upon said tubular extension and having a spiral thread engaged with the teeth of said jaws, the opposite end of said member having a central opening adapted to receive the outer end of the hub, means carried by said member for operating a pump, and means whereby vertical adjustment of said shank may be effected.

13. A combined automobile jack and tire pump comprising an upright jack shank having a bore, an arm rising from said shank, a bearing formed on the upper end of said arm, a wheel engaging member revolubly mounted in said bearing, means for clamping said member to the wheel of an automobile, a cam extending laterally from said member, a piston in said bore and having an upright piston rod, a head on said rod located in the path of said cam, a coil spring interposed between said head and the upper end of the shank, and means whereby vertical adjustment of said shank may be effected.

14. A combined automobile jack and tire pump comprising an upright jack shank having a bore, a pair of upright arms rising in spaced relation from said shank, alined bearings formed on the upper ends of said arms, a substantially cylindrical wheel engaging member revolubly mounted in said bearings, a cam projecting laterally from the periphery of said member and located between said arms, a piston in said bore, an upright piston rod rising from said piston and having a head located in the path of said cam, a coil spring interposed between said head and the upper end of the shank, and means whereby vertical adjustment of said shank may be effected.

15. A combined automobile jack and tire pump comprising an upright jack shank, a hollow substantially cylindrical hub engaging member revolubly supported thereby, clamping means carried by said member whereby the same may be removably secured to an automobile wheel, means carried by said member for operating a pump, means whereby vertical adjustment of said shank may be effected, and an upright wall formed on one end of said member, said wall having a polygonal opening at its center adapted to receive a nut on the end of an automobile hub or to receive a head formed on an independent operating crank.

16. A combined automobile jack and tire pump comprising a guide having an upright slot, a combined jack shank and pump cylinder slidably mounted in said guide, a discharge nipple projecting laterally from said combined shank and cylinder and passing through said slot, a flexible tube connected to said nipple, a piston within the cylinder and mechanism carried by said combined shank and cylinder for raising the wheel of an automobile and for reciprocating said piston.

17. A combined automobile jack and tire pump comprising a vertically adjustable jack shank, a rotatable member carried by said shank and adapted for attachment to and rotation by an automobile wheel, and an air compressor actuated upon rotation of the aforesaid member.

In testimony whereof I have hereunto set my hand in presence of two subscribing witnesses.

SHERMAN McNABB.

Witnesses:
J. O. MEYER,
J. H. PATTERSON.